(12) United States Patent
Suciu et al.

(10) Patent No.: US 9,506,402 B2
(45) Date of Patent: Nov. 29, 2016

(54) THREE SPOOL ENGINE BEARING CONFIGURATION

(75) Inventors: Gabriel L. Suciu, Glastonbury, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 784 days.

(21) Appl. No.: 13/193,757

(22) Filed: Jul. 29, 2011

(65) Prior Publication Data

US 2013/0025257 A1 Jan. 31, 2013

(51) Int. Cl.
*F02C 7/06* (2006.01)

(52) U.S. Cl.
CPC ........................ *F02C 7/06* (2013.01)

(58) Field of Classification Search
CPC ................. F01D 25/16–25/168; F02C 7/06; F16C 2360/23
USPC ........ 60/39.08, 792, 226.1, 39.163; 184/6.11
See application file for complete search history.

(56) References Cited

U.S. PATENT DOCUMENTS

| 3,385,064 A | | 5/1968 | Wilde et al. | |
|---|---|---|---|---|
| 3,524,318 A | * | 8/1970 | Bouiller et al. | 60/226.1 |
| 4,561,246 A | * | 12/1985 | Hovan | 60/226.1 |
| 4,790,133 A | * | 12/1988 | Stuart | 60/226.1 |
| 6,708,482 B2 | | 3/2004 | Seda | |
| 7,097,415 B2 | | 8/2006 | Bart et al. | |
| 7,299,621 B2 | | 11/2007 | Bart et al. | |
| 7,921,634 B2 | | 4/2011 | Orlando et al. | |
| 2009/0133380 A1 | | 5/2009 | Donnerhack | |
| 2010/0089019 A1 | | 4/2010 | Knight et al. | |
| 2010/0126141 A1 | * | 5/2010 | Schilling | 60/268 |
| 2010/0205934 A1 | | 8/2010 | Gallet | |

FOREIGN PATENT DOCUMENTS

EP        1394385 A1        3/2004

OTHER PUBLICATIONS

European Search Report for EP Application No. 12178496.1 dated Sep. 22, 2016.

* cited by examiner

*Primary Examiner* — Phutthiwat Wongwian
*Assistant Examiner* — Jason H Duger
(74) *Attorney, Agent, or Firm* — Carlson, Gaskey & Olds, P.C.

(57) ABSTRACT

A gas turbine engine includes a core section having a low spool, intermediate spool and a high spool that rotate about a common axis. The intermediate spool is supported at an aft position by an inter-shaft bearing arrangement on the low spool. The low spool is supported for rotation in an aft position by an aft roller bearing supported on a turbine exhaust case of the gas turbine engine. The high spool is supported by a high spool aft roller bearing disposed within a high spool bearing compartment. The high spool bearing compartment is positioned within a radial space between the combustor and the axis.

9 Claims, 2 Drawing Sheets

THREE SPOOL ENGINE BEARING CONFIGURATION

BACKGROUND

This disclosure generally relates to a gas turbine engine including three spools. More particularly, this disclosure relates to a bearing arrangement for supporting rotation of each of the three rotating spools.

A gas turbine engine includes a core section that draws airflow into a compressor that compresses incoming airflow, and feeds the compressed air into a combustor. In the combustor fuel is added and ignited to generate a high speed flow stream that creates thrust and is exhausted through a turbine. A core section typically includes a low spool that includes a low pressure compressor section and a high spool that includes a high pressure compressor section. The low spool is typically driven by turbine blades within a low pressure turbine section and the high spool is driven by turbine blades within a high pressure turbine section. The different spools provide for different rotational speed between the spools to improve engine efficiencies.

It is further known to include an intermediate spool to further provide improvements in engine efficiencies by rotating at still another speed than both the low spool and the high spool. The addition of the intermediate spool complicates bearing arrangements as additional lubricant and cooling passages are required for the additional bearings required to support the intermediate spool. Typically, the intermediate spool and the high spool are supported by a hot strut disposed just aft of the combustor section. The hot strut is exposed to hot combustion gases. Therefore, cooling of the strut and the lubricant passages through the strut for the bearings is required to maintain lubricant at a desired temperature to prevent lubricant degradation. Moreover, the hot strut increases the overall length of the engine. The required hot strut therefore creates high demands on lubricant and cooling of bearings and limits placement choices of engine architecture.

SUMMARY

A disclosed geared turbofan gas turbine engine includes a turbofan section and a core section that includes a low spool, intermediate spool and a high spool that rotate about a common axis. The intermediate spool is supported at an aft position by an inter-shaft bearing arrangement on the low spool. An aft roller bearing supported on a turbine exhaust case of the gas turbine engine supports the low spool. The high spool is supported by a high spool aft roller bearing disposed within a high spool bearing compartment. The high spool bearing compartment is positioned within a radial space between the combustor and the axis.

Mounting of the intermediate spool aft roller bearing on the low spool and the high spool aft roller bearing with the bearing compartment eliminates requirement of a support strut that extends through the turbine section. Elimination of such a support strut reduces cooling and lubricant burdens caused by the extreme temperatures of the turbine section.

These and other features disclosed herein can be best understood from the following specification and drawings, the following of which is a brief description.

DETAILED DESCRIPTION

Figure 1:
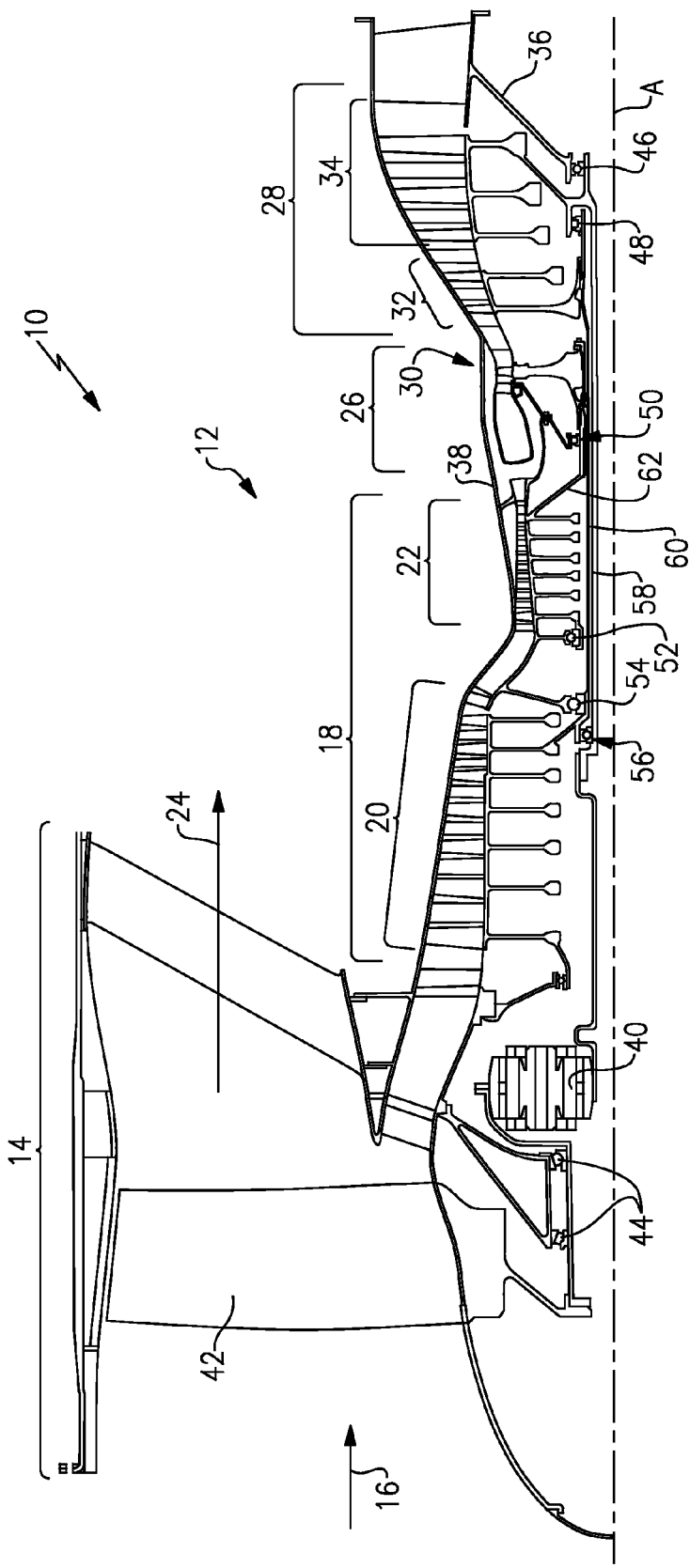
FIG. 1 is a cross-section of an example geared turbofan three spool gas turbine engine.

Referring to FIG. 1, a geared turbofan gas turbine engine 10 includes a turbofan section 14 and a core section 12. Airflow 16 enters the core section 12 and is compressed in a compressor 18 having a low compressor section 20 and a high compressor section 22. A portion of the airflow 24 bypasses the core section 12. A combustor 26 receives compressed air from the compressor 18, mixes the air with fuel and ignites the mixture to generate a high velocity gas flow stream. The high velocity gas flow stream drives a turbine 28.

The example turbine 28 includes a high pressure turbine 30, an intermediate pressure turbine 32 and a low pressure turbine 34. The example low spool 58 drives a gearbox 40 that in turn drives a fan 42 supported by roller bearings 44 at a desired speed different than the speed of the low spool 58. It should be understood that although a geared turbofan gas turbine engine is shown by way of example, other gas turbine engine architectures would benefit from this disclosure.

The low spool 58, intermediate spool 60 and high spool 62 are all supported for rotation about a common axis A. The example low spool 58 is supported at an aft position by a low spool aft roller bearing 46. The low spool aft roller bearing 46 is supported on a turbine exhaust case 36. The forward end of the low spool 58 is supported by a thrust bearing 56. The intermediate spool 60 is supported at an aft position by an intermediate spool aft roller bearing 48 and at a forward end by an intermediate spool thrust bearing 54. The high spool 62 is supported by a high spool aft roller bearing 64 disposed within a high spool bearing compartment 50. A high spool thrust bearing 52 supports a forward portion of the high spool 62 within the high pressure compressor section 22.

Figure 2:
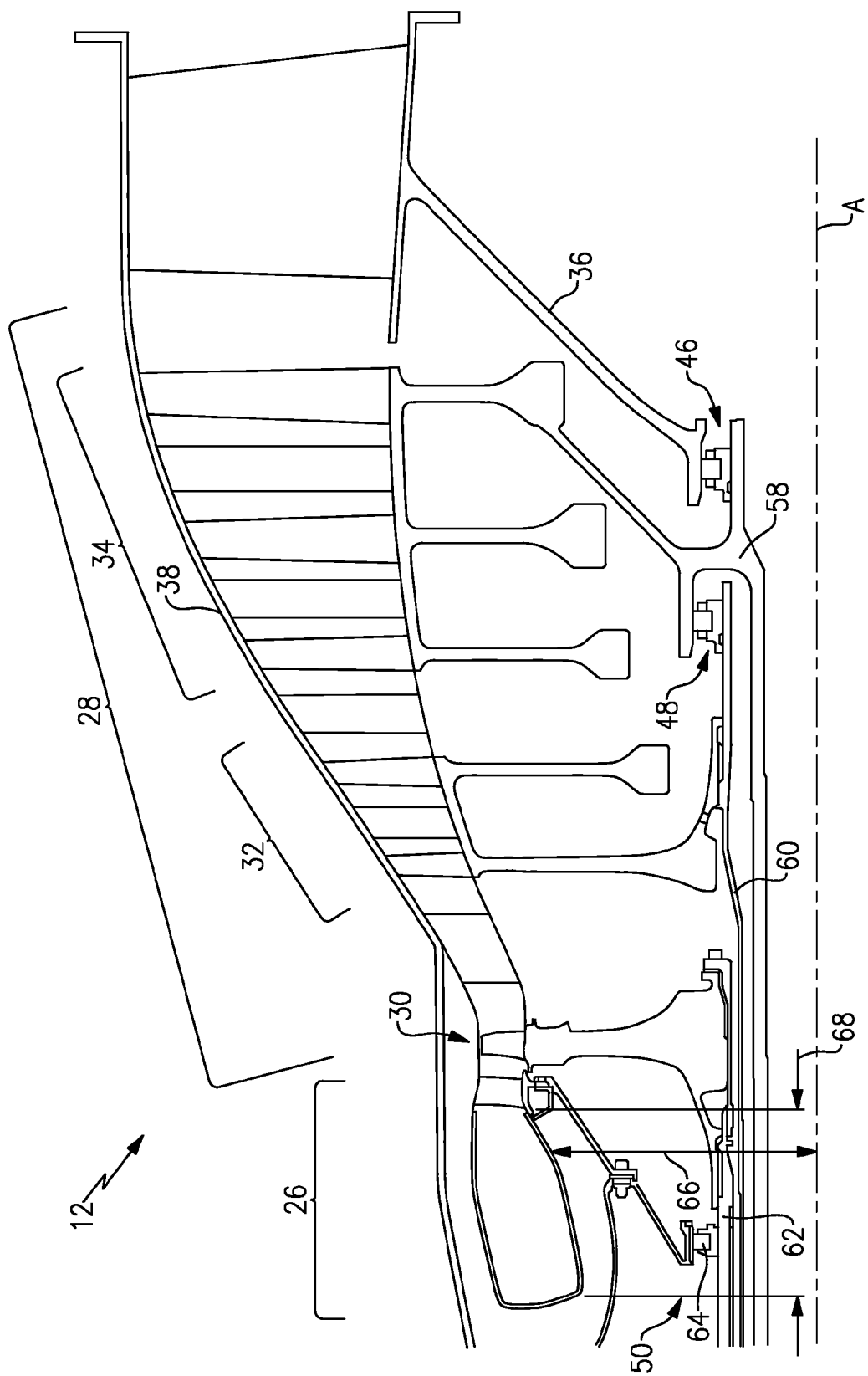
FIG. 2 is an enlarged cross-section of a portion of the geared turbofan three spool gas turbine engine.

Referring to FIG. 2, the intermediate spool 60 is supported for rotation at an aft position by the low spool 58. Instead of providing a strut that would have to extend from the engine case 38 through the turbine section 28 and the accompanying hot gases, the intermediate spool 60 is supported for rotation by the intermediate spool aft roller bearing 48. The intermediate spool aft roller bearing 48 comprises an inter-shaft bearing arrangement supported on the low spool 58. Because the intermediate spool 60 is supported for rotation on the low spool 58, a separate support strut is not required and the accompanying lubricant and separate cooling passages that support the intermediate spool aft roller bearing 48 are not required.

The high spool 62 is supported at an aft end by a high spool aft roller bearing 64 supported within the bearing compartment 50. The example bearing compartment is disposed within a radial space 66 between the combustor 26 and the axis A. The position of the bearing compartment 50 further eliminates the need for a support strut that extends through the turbine section 28. In this example, the bearing compartment 50 is disposed within an axial length 68 of the combustor 26. The high pressure turbine 30 is supported axially rearward of the high spool aft roller bearing 64.

Supporting rotation of the intermediate spool 60 on the low spool 58 with the inter-shaft roller bearing 48 provides for the elimination of a support strut through the turbine 28. Moreover, mounting of the high spool aft roller bearing 64 within the bearing compartment between the combustor 26 and axis A further reduces the need for separate supports within the turbine section. Because the support strut is eliminated, cooling and lubricant requirements are reduced and the entire engine may be configured with a shorter overall length. Accordingly, the disclosed engine bearing architecture provides for a reduction in overall engine weight and cost.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A gas turbine engine assembly comprising:
   a core section including a compressor, a combustor and a turbine supported along an axis;
   a low spool supported for rotation about the axis, the low spool including a low turbine section;
   an intermediate spool including an intermediate turbine section axially forward of the low turbine section, the intermediate turbine section including all stages rotatable with the intermediate spool, the intermediate spool supported for rotation coaxially with the low spool by an aft intermediate spool bearing supported on the low spool, wherein the aft intermediate spool bearing is axially rearward of turbine blades attached to the low spool for rotation with the low spool;
   a high spool supported for rotation coaxially with the low spool and the intermediate spool; and
   a high spool bearing compartment supporting an aft high spool bearing, wherein the high spool bearing compartment and the aft high spool bearing are disposed within a radial space between the combustor and the axis.

2. The gas turbine engine assembly as recited in claim 1, including a turbine exhaust case supporting an aft low spool bearing supporting rotation of the low spool.

3. The gas turbine engine assembly as recited in claim 1, wherein the aft intermediate spool bearing is a roller bearing.

4. The gas turbine engine assembly as recited in claim 2, wherein the aft low spool bearing is rearward of the aft intermediate spool bearing.

5. The gas turbine engine assembly as recited in claim 1, wherein a turbine blade supported on the high spool is rearward of the high spool bearing compartment.

6. The gas turbine engine assembly as recited in claim 1, wherein the low spool drives a gearbox for driving a fan.

7. A geared turbofan gas turbine engine assembly comprising:
   a core section including a compressor section, a combustor section and a turbine section disposed about a common axis;
   a turbofan section including a gearbox and a single fan;
   a low spool supported for rotation about the common axis, the low spool including a low turbine section configured to drive the single fan through the gearbox;
   an intermediate spool including an intermediate turbine section axially forward of the low turbine section, the intermediate turbine section including all stages rotatable with the intermediate spool, the intermediate spool supported for rotation coaxially with the low spool by an aft intermediate spool bearing supported on the low spool, wherein the aft intermediate spool bearing is within an axial space between turbine blades attached to and rotatable with the low spool and a radial space between the intermediate spool and the low spool; and
   a high spool supported for rotation coaxially with the low spool and the intermediate spool;
   a high spool bearing compartment supporting an aft high spool bearing, wherein the high spool bearing compartment and the aft high spool bearing are within a radial space between the combustor section and the common axis.

8. The gas turbine engine assembly as recited in claim 7, including a turbine exhaust case supporting an aft low spool bearing supporting rotation of the low spool.

9. The gas turbine engine assembly as recited in claim 7, wherein the aft intermediate spool bearing is a roller bearing.

* * * * *